United States Patent
Kong et al.

(10) Patent No.: US 11,040,248 B2
(45) Date of Patent: Jun. 22, 2021

(54) BICYCLE TRAINER COMPENSATION ALGORITHM BASED ON MULTI-GROOVE BELTS SLIDING RELATIVE TO ONE ANOTHER

(71) Applicant: QINGDAO MAGENE INTELLIGENCE TECHNOLOGY CO., LTD., Qingdao (CN)

(72) Inventors: Fanbin Kong, Qingdao (CN); Feng Yu, Qingdao (CN); Bo Yang, Qingdao (CN)

(73) Assignee: QINGDAO MAGENE INTELLIGENCE TECHNOLOGY CO., LTD., Qingdao (CN)

( * ) Notice: Subject to any disclaimer, the term of this patent is extended or adjusted under 35 U.S.C. 154(b) by 82 days.

(21) Appl. No.: 16/618,254

(22) PCT Filed: Apr. 15, 2019

(86) PCT No.: PCT/CN2019/082728
§ 371 (c)(1),
(2) Date: Nov. 29, 2019

(87) PCT Pub. No.: WO2019/242389
PCT Pub. Date: Dec. 26, 2019

(65) Prior Publication Data
US 2021/0146194 A1 May 20, 2021

(30) Foreign Application Priority Data
Jun. 21, 2018 (CN) .......................... 201810639997.3

(51) Int. Cl.
| | |
|---|---|
| *A63B 24/00* | (2006.01) |
| *G01L 3/24* | (2006.01) |
| *A63B 71/06* | (2006.01) |
| *A63B 22/06* | (2006.01) |

(52) U.S. Cl.
CPC .......... *A63B 24/0062* (2013.01); *A63B 22/06* (2013.01); *A63B 71/0622* (2013.01); *G01L 3/242* (2013.01); *A63B 2071/0638* (2013.01); *A63B 2220/35* (2013.01); *A63B 2220/54* (2013.01)

(58) Field of Classification Search
CPC . A63B 22/06; A63B 24/0062; A63B 71/0619; A63B 71/0622; A63B 2071/0638; A63B 2220/30; A63B 2220/34; A63B 2220/35; A63B 2220/50; A63B 2220/54; A63B 2220/80; A63B 2220/83; A63B 2220/833
See application file for complete search history.

(56) References Cited

U.S. PATENT DOCUMENTS

| | | | |
|---|---|---|---|
| 5,256,115 A | 10/1993 | Scholder | |
| 6,450,922 B1* | 9/2002 | Henderson | ......... A63B 24/0084 482/8 |
| 9,429,489 B2* | 8/2016 | Goldstein | ................ B62J 99/00 |
| 10,035,558 B2* | 7/2018 | Zenner | ...................... B62M 6/50 |
| 2007/0042868 A1* | 2/2007 | Fisher | ...................... B62D 1/02 482/8 |
| 2007/0093360 A1* | 4/2007 | Neff | .......................... G06F 3/03 482/8 |
| 2007/0117680 A1* | 5/2007 | Neff | ...................... A63B 21/055 482/8 |
| 2007/0245835 A1* | 10/2007 | Hauschildt | ......... A63B 71/0619 73/862.391 |
| 2010/0035726 A1* | 2/2010 | Fisher | ................ A63B 24/0084 482/8 |
| 2014/0274565 A1* | 9/2014 | Boyette | .............. A63B 23/0476 482/6 |
| 2015/0019062 A1* | 1/2015 | Previdi | ..................... B60L 7/12 701/22 |
| 2015/0258381 A1 | 9/2015 | Suzuki | |
| 2015/0306458 A1* | 10/2015 | Watarai | .............. A63B 24/0062 340/432 |
| 2016/0116356 A1* | 4/2016 | Goldstein | ............... G01L 5/105 73/1.15 |
| 2016/0362021 A1* | 12/2016 | Sveje | ...................... B60L 50/51 |
| 2018/0001181 A1* | 1/2018 | von Prellwitz | .... A63B 24/0075 |
| 2018/0259546 A1* | 9/2018 | Corno | ..................... G01P 3/489 |

FOREIGN PATENT DOCUMENTS

| | | |
|---|---|---|
| CN | 202420741 U | 9/2012 |
| CN | 103454022 A | 12/2013 |
| CN | 106890444 A | 6/2017 |
| CN | 206339320 U | 7/2017 |
| CN | 108801522 A | 11/2018 |
| WO | 2014199376 A1 | 12/2014 |

* cited by examiner

*Primary Examiner* — Gary D Urbiel Goldner
(74) *Attorney, Agent, or Firm* — Bayramolgu Law Offices LLC

(57) ABSTRACT

A bicycle trainer compensation algorithm based on multi-groove belts sliding relative to one another includes: determining a load interval and a rotating speed range, recording an external driving torque, a rotating speed, a measured torque and a no-load mechanical loss of the bicycle trainer under conditions of different loads and different rotating speeds, and obtaining a relationship between a mechanical loss of a whole machine and the different rotating speeds, the different loads, and the no-load mechanical loss, fitting a plurality of sets of relationships to obtain an algorithm relation, verifying universality of the algorithm relation, and further fitting to obtain a compensation algorithm relation, and verifying whether a compensation accuracy of the compensation algorithm relation is satisfied within an error requirement.

8 Claims, No Drawings

BICYCLE TRAINER COMPENSATION ALGORITHM BASED ON MULTI-GROOVE BELTS SLIDING RELATIVE TO ONE ANOTHER

CROSS REFERENCE TO THE RELATED APPLICATIONS

This application is the national phase entry of International Application No. PCT/CN2019/082728, filed on Apr. 15, 2019, which is based upon and claims priority to Chinese Patent Application No. 201810639997.3, filed on Jun. 21, 2018, the entire contents of which are incorporated herein by reference.

TECHNICAL FIELD

The present disclosure pertains to the technical field of mechanical loss bicycle trainer compensation algorithm, and more specifically relates to a bicycle trainer compensation algorithm based on multi-groove belts sliding relative to one another.

BACKGROUND

Virtual cycling fitness is emerging as a significant application of virtual reality technology. Virtual cycling fitness combines an ordinary bicycle trainer with virtual reality technology to avoid the monotony of indoor cycling and the dangers of outdoor cycling. Virtual cycling fitness is therefore able to help cycling exercisers to achieve the purpose of fitness and toning, while also ensuring entertainment. Regardless of the type of mechanical equipment used by the bicycle trainer, whether gear or belt transmission, there will be inevitable mechanical loss. For example, bicycle trainers generally employ a multi-groove belt transmission, resulting in a waste of energy since the effort input by the user is more than the power output by the bicycle trainer. How to accurately measure the actual power acting on the bicycle trainer is an urgent technical problem to be solved.

SUMMARY

In view of various deficiencies in the prior art, a bicycle trainer compensation algorithm based on multi-groove belts sliding relative to one another is proposed to solve the above problems.

In order to achieve the above objective, the present disclosure provides the technical solutions as follows:

A bicycle trainer compensation algorithm based on multi-groove belts sliding relative to one another, including the following steps:

S1: determining a load interval and a rotating speed range, recording an external driving torque, a rotating speed, a measured torque, and a no-load mechanical loss of the bicycle trainer under the conditions of different loads and different rotating speeds;

S2: calculating a difference value between the external driving torque and the measured torque as a mechanical loss of a whole machine, and obtaining a relationship between the mechanical loss of the whole machine and the rotating speed, the load, and no-load mechanical loss;

S3: repeating steps S1-S2 for a plurality of bicycle trainers to obtain a plurality of sets of relationships, and fitting the plurality of sets of relationships to obtain an algorithm relation;

S4: verifying universality of the algorithm relation, and further fitting to obtain a compensation algorithm relation; and S5: verifying whether a compensation accuracy of the compensation algorithm relation meets an error requirement.

Further, in step S1, a load and a rotating speed of the operating bicycle trainer are continuously recorded for 10-20 days as sample values to form a plurality of sample values, and the plurality of sample values are fitted to form the load interval and the rotating speed range respectively.

Further, in the virtual working process of the bicycle trainer, an external driving torque, a rotating speed, a measured torque and a no-load mechanical loss are recorded, and the recording method is specifically as follows:

S11: the bicycle trainer takes a specific value within the load interval and runs for 30-40 min, traversing all values within the rotating speed range, recording the external driving torque, the rotating speed, the measured torque, and the no-load mechanical loss; and S12: repeating step S11 until all the values within the load interval are traversed.

Further, the external driving torque is obtained by an industrial grade torque sensor directly connected to a drive motor, and the measured torque is obtained by a built-in torque sensor in the bicycle trainer.

Further, the external driving torque is set to ET, the measured torque is IT, the rotating speed is S, the load is R, the no-load mechanical loss is L, the mechanical loss of the whole machine is D, then $D=ET-IT=(1+x)*L$, x is a coefficient, and $x=k*IT+b$, wherein k and b is obtained by fitting a relationship between x and IT under different rotating speed values taken from the rotating speed range.

Further, in step S3, 3-5 inspected and qualified bicycle trainers are selected as samples. The steps S1-S2 are repeated to obtain a plurality of sets of relationships, analyzing the relationship between the mechanical loss of the whole machine and the no-load mechanical loss under the conditions of different rotating speeds and different loads, and fitting to obtain an algorithm relation.

Further, in step S4, a number of samples is expanded, and 25-30 inspected and qualified bicycle trainers are selected, steps S1-S3 are repeated to obtain a plurality of sets of algorithm relations, filtering interference. If the plurality of sets of algorithm relations are consistent, then the algorithm relations are considered to be universal. Further, fitting to obtain a compensation algorithm relation according to the plurality of sets of the algorithm relations.

Further, in step S5, additional 20-30 inspected and qualified bicycle trainers are randomly selected for a power contrast test. An actual power value is compensated by the compensation algorithm relation. If an error between a compensated power value and a driving power value is maintained at ±2%, the compensation algorithm relation is considered to satisfy the error requirement, and the actual power value of the bicycle trainer can be accurately measured by the compensation algorithm relation.

The advantages of the present disclosure are as follows:

The values of the external driving torque, the rotating speed, the measured torque and the no-load mechanical loss of the operating bicycle trainer with multi-groove belt transmission are collected, and analyzing to obtain the relationship of various different parameters, and the influence rule caused by the multi-groove belt to the driving power is obtained, thereby fitting the compensation algorithm relation, which is contributed to enhance the power measurement accuracy of the bicycle trainer with multi-groove belt transmission.

DETAILED DESCRIPTION OF THE EMBODIMENTS

In order to enable those skilled in the art to preferably understand the technical solution of the present disclosure, the technical solution of the present disclosure will be clearly and completely described below. Based on the embodiment of the present application, other similar embodiments obtained by those skilled in the art without creative efforts shall fall within the scope of the present application for protection.

Embodiment 1

A bicycle trainer compensation algorithm based on multi-groove belts sliding relative to one another includes the following steps.

Firstly, the load and the rotating speed of the operating bicycle trainer are continuously recorded for 10-20 days as sample values to form a plurality of sample values, and fitting the plurality of sample values to form a load interval and a rotating speed range respectively. In the virtual working process, the bicycle trainer takes a specific value within the load interval and runs for 30-40 min, traversing all values within the rotating speed range. An external driving torque, a rotating speed, a measured torque, and a no-load mechanical loss are recorded. The above step is repeated until all the values within the load interval are traversed, wherein the external driving torque is obtained by an industrial grade torque sensor directly connected to a drive motor, and the measured torque is obtained by a built-in torque sensor in the bicycle trainer.

Secondly, the difference value between the external driving torque and the measured torque is calculated as the mechanical loss of the whole machine, and the relationship between the mechanical loss of the whole machine and the rotating speed, the load, the no-load mechanical loss is obtained. Theoretically, under the conditions of a fixed rotating speed and a fixed load, the work done by the external driving torque completely acts on the bicycle trainer, and the measured torque of the bicycle trainer should be the same as the external driving torque. However, belt slippage and mechanical loss result in a work loss, and the measured torque ultimately acting on the inertia wheel is less than the external driving torque acting on the whole bicycle trainer system. The external driving torque is set to ET, the measured torque is IT, the rotating speed is S, the load is R, the no-load mechanical loss is L, the mechanical loss of the whole machine is D, then $D=ET-IT=(1+x)*L$, x is a coefficient, and $x=k*IT+b$, wherein k and b is obtained by fitting a relationship between x and IT under different rotating speed values taken from the rotating speed range.

Afterwards, 3-5 inspected and qualified bicycle trainers are selected as samples. The above steps are repeated to obtain a plurality of sets of relationships, analyzing the relationship between the mechanical loss of the whole machine and the no-load mechanical loss under the conditions of different rotating speeds and different loads, and fitting to obtain an algorithm relation.

Lastly, verifying universality of the algorithm relation and verifying whether the compensation accuracy of the compensation algorithm relation is satisfied within the error requirement, is specifically as follows:

(1) The number of samples is expanded, and 25-30 inspected and qualified bicycle trainers are selected. The above steps are repeated to fit to obtain a plurality of sets of algorithm relations respectively, filtering the interference. If the plurality of sets of algorithm relations are consistent, then the algorithm relation is considered to be universal. Further, fitting to obtain a compensation algorithm relation according to the plurality of sets of the algorithm relations.

(2) Additional 20-30 inspected and qualified bicycle trainers are randomly selected for a power comparison test. The actual power value is compensated by the compensation algorithm relation. If an error between the compensated power value and the driving power value is maintained at ±2%, the compensation algorithm relation is considered to satisfy the error requirement, and the actual power value of the bicycle trainer can be accurately measured by the compensation algorithm relation.

The present disclosure has been described in detail above, and the foregoing is only a preferred embodiment of the present disclosure, which is not intended to limit the implement scope of the present disclosure, namely, all equivalent variations and modifications according to the scope of the application shall still fall within the scope of the present disclosure.

What is claimed is:

1. A bicycle trainer compensation algorithm based on multi-groove belts sliding relative to one another, the bicycle trainer compensation algorithm comprising the following steps:
   S1, determining a load interval and a rotating speed range, recording an external driving torque, a rotating speed, a measured torque, and a no-load mechanical loss of each of a plurality of bicycle trainers respectively under conditions of different rotating speeds and different loads;
   S2, calculating a difference value between the external driving torque and the measured torque of each of the plurality of bicycle trainers under the conditions as a mechanical loss of a whole machine, and obtaining, for each of the plurality of bicycle trainers, a relationship between the mechanical loss of the whole machine and the different rotating speeds, the different loads, and the no-load mechanical loss;
   S3, obtaining a plurality of relationships for the plurality of bicycle trainers as a set comprising the relationship of each of the plurality of bicycle trainers, and fitting the plurality of relationships to obtain an algorithm relation;
   S4, verifying a universality of the algorithm relation, and further fitting the algorithm relation to obtain a compensation algorithm relation; and
   S5, verifying whether a compensation accuracy of the compensation algorithm relation is satisfied within an error requirement.

2. The bicycle trainer compensation algorithm based on the multi-groove belts sliding relative to one another according to claim 1, wherein in the step S1, the different loads and the different rotating speeds of operating each of the plurality of bicycle trainers are continuously recorded as a plurality of sample values for 10-20 days, and the plurality of sample values are fitted to form the load interval and the rotating speed range, respectively.

3. The bicycle trainer compensation algorithm based on the multi-groove belts sliding relative to one another according to claim 2, wherein in a virtual working process of the plurality of bicycle trainers, the external driving torques, the rotating speeds, the measured torques and the no-load mechanical losses respectively of the plurality of bicycle trainers are recorded by the following steps:
   S6, each of the plurality of bicycle trainers taking a predetermined value within the load interval and running for 30-40 minutes, traversing all values of the different rotating speeds within the rotating speed range; and recording the external driving torque, the rotating speed, the measured torque, and the no-load mechanical loss; and S7, repeating the step S6 until all values of the different loads within the load interval are traversed.

4. The bicycle trainer compensation algorithm based on the multi-groove belts sliding relative to one another according to claim 3, wherein the external driving torques are obtained by an industrial grade torque sensor directly connected to a drive motor, and the measured torques are obtained by a built-in torque sensor each of the plurality of bicycle trainers.

5. The bicycle trainer compensation algorithm based on the multi-groove belts sliding relative to one another according to claim 3, wherein the external driving torque is set to ET, the measured torque is set to IT, the rotating speed is set to S, the different loads are set to R, the no-load mechanical loss is set to L, and the mechanical loss of the whole machine is set to D, then $D=ET-IT=(1+x)*L$, x is a coefficient, and $x=k*IT+b$, wherein k and b are obtained by fitting a plurality of relationships between x and IT under different rotating speed values taken from the rotating speed range.

6. The bicycle trainer compensation algorithm based on the multi-groove belts sliding relative to one another according to claim 5, wherein in the step S1, 3-5 inspected and qualified bicycle trainers of the plurality of bicycle trainers are selected as a plurality of samples; the steps S1-S2 are repeated to obtain the plurality of relationships, analyzing, for each of the 3-5 inspected and qualified bicycle trainers of the plurality of bicycle trainers, the relationship between the mechanical loss of the whole machine and the no-load mechanical loss respectively under the conditions of the different rotating speeds and the different loads, and fitting the plurality of relationships to obtain the algorithm relation.

7. The bicycle trainer compensation algorithm based on the multi-groove belts sliding relative to one another according to claim 6, wherein in the step S4, a number of the plurality of samples is expanded, and 25-30 inspected and qualified bicycle trainers of the plurality of bicycle trainers are selected; repeating the steps S1-S3, fitting a plurality of algorithm relations respectively, filtering interference, if the plurality of algorithm relations are consistent, then the plurality of algorithm relations are considered to be universal, and further fitting to obtain the compensation algorithm relation according to the plurality of algorithm relations.

8. The bicycle trainer compensation algorithm based on the multi-groove belts sliding relative to one another according to claim 7, wherein in the step S5, an additional 20-30 inspected and qualified bicycle trainers of the plurality of bicycle trainers are randomly selected for a power contrast test; an actual power value of each bicycle trainer of the additional 20-30 inspected and qualified bicycle trainers is compensated by the compensation algorithm relation; if an error between a compensated power value and a driving power value is maintained at ±2%, the compensation algorithm relation is considered to satisfy the error requirement, and the actual power value of the each bicycle trainer of the additional 20-30 inspected and qualified bicycle trainers is accurately measured by the compensation algorithm relation.

\* \* \* \* \*